US012631786B2

(12) United States Patent
Han

(10) Patent No.: US 12,631,786 B2
(45) Date of Patent: May 19, 2026

(54) EVALUATION OF CEMENT SHEATH DAMAGE IN UNDERGROUND STORAGE CAVITY DURING EARTHQUAKE

(71) Applicant: ARAMCO SERVICES COMPANY, Houston, TX (US)

(72) Inventor: Yanhui Han, Houston, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 397 days.

(21) Appl. No.: 18/344,632

(22) Filed: Jun. 29, 2023

(65) Prior Publication Data

US 2025/0004163 A1 Jan. 2, 2025

(51) Int. Cl.
| | |
|---|---|
| *G01V 20/00* | (2024.01) |
| *E21B 41/00* | (2006.01) |
| *E21B 49/00* | (2006.01) |

(52) U.S. Cl.
CPC .......... *G01V 20/00* (2024.01); *E21B 41/0057* (2013.01); *E21B 49/00* (2013.01); *E21B 2200/20* (2020.05)

(58) Field of Classification Search
None
See application file for complete search history.

(56) References Cited

U.S. PATENT DOCUMENTS

| | | |
|---|---|---|
| 2010/0312589 A1 | 12/2010 | Gerald et al. |
| 2011/0066380 A1 | 3/2011 | Hager et al. |
| 2012/0109611 A1 | 5/2012 | Loizzo et al. |
| 2015/0300159 A1 | 10/2015 | Stiles et al. |

(Continued)

FOREIGN PATENT DOCUMENTS

| | | |
|---|---|---|
| CN | 102495935 B | 4/2014 |
| CN | 112814739 B | 4/2022 |

OTHER PUBLICATIONS

Li, Longxin, et al. "Underground gas storage process optimization using integrated subsurface characterization, dynamic modeling and monitoring-a case study." Abu Dhabi International Petroleum Exhibition and Conference. SPE, 2021. (Year: 2021).*

(Continued)

*Primary Examiner* — Raymond L Nimox
(74) *Attorney, Agent, or Firm* — Osha Bergman Watanabe & Burton LLP

(57) ABSTRACT

A method for evaluating potential damage to a cement sheath in an underground gas storage facility during an earthquake. A ground surface earthquake (EQ) wave is obtained on which a deconvolution analysis is performed, producing a subsurface EQ wave. Static and dynamic mechanical properties of a casing-cement-rock well system are obtained, and a computational model of the underground gas storage facility is generated. A gas pressure value is applied to the model, and, after boundary conditions are applied, a static equilibrium state is simulated. The subsurface EQ wave and boundary conditions are applied to the model, and, based on the gas pressure value, a dynamic seismic event is simulated. Based on the effect of the seismic simulation on the integrity of the underground gas storage facility, at least one parameter related to the operation of the underground gas storage facility may be adjusted.

13 Claims, 9 Drawing Sheets

(56)             References Cited

U.S. PATENT DOCUMENTS

2020/0325759 A1* 10/2020 Sharma ................. E21B 49/006
2021/0082543 A1    3/2021 Mn et al.
2024/0401431 A1* 12/2024 Jandhyala ............... E21B 33/14

OTHER PUBLICATIONS

Bois, Axel-Pierre et al., "Cement sheath integrity for CO2 storage—An integrated perspective"; Energy Procedia; vol. 37; pp. 5628-5641; 2013 (14 pages).
Wang, Tongtao et al., "Dynamic response of underground gas storage salt cavern under seismic loads"; Tunnelling and Underground Space Technology; vol. 43; pp. 241-252; Jul. 2014 (12 pages).
Shadravan, Arash et al., "Using Fatigue-Failure Envelope for Cement-Sheath-Integrity Evaluation"; SPE Drilling & Completion; vol. 30, Issue 1, Paper No. SPE-168321-PA; pp. 68-75; Mar. 2015 (8 pages).
Bois, Axel-Pierre et al., "Use of a Mechanistic Model to Forecast Cement-Sheath Intergrity"; SPE Drilling & Completion; vol. 27, Issue 2, Paper No. SPE-139668-PA; pp. 303-314; Jun. 2012 (12 pages).
Habibi, Rahim et al., "Stability analysis of complex behavior of salt cavern subjected to cyclic loading by laboratory measurement and numerical modeling using LOCAS (case study: Nasrabad gas storage salt cavern)"; Environmental Earth Sciences; vol. 80, Issue 8, Article No. 317; pp. 1-21; Apr. 2021 (21 pages).

Han, Y. et al., "Numerical Modeling of Elastic Spherical Contact for Mohr-Coulomb Type Failures in Micro-Geomaterials"; Experimental Mechanics; vol. 57, Issue 7; pp. 1091-1105; Sep. 2017 (15 pages).
He, Tao et al., "Fatigue Damage of Wellbore Cement Sheath in Gas Storage Salt Cavern Under Alternating Internal Pressure"; Rock Mechanics and Rock Engineering; vol. 55, Issue 2; pp. 715-732; Feb. 2022 (18 pages).
He, Tao et al., "Integrity analysis of wellbores in the bedded salt cavern for energy storage"; Energy; vol. 263, Part B, Article 125841; pp. 1-18; Jan. 15, 2023 (18 pages).
He, Tao et al., "Failure mode of cement sheath in salt cavern gas storge wellbore based on coupling plasticity and damage evolution"; International Journal of Rock Mechanics and Mining Sciences; vol. 160, Article 105272; pp. 1-20; Dec. 2022 (20 pages).
Zhuang, Haiyang et al., "Seismic response and damage analysis of underground structures considering the effect of concrete diaphragm wall"; Soil Dynamics and Earthquake Engineering; vol. 116; pp. 278-288; Jan. 2019 (11 pages).
Idriss, I. M et al. (Eds.), "User's Manual for SHAKE91"; A Computer Program for Conducting Equivalent Linear Seismic Response Analyses of Horizontally Layered Soil Deposits; Structures Division, Building and Fire Research Laboratory, National Institute of Standards and Technology; Center for Geotechnical Modeling, Department of Civil & Environmental Engineering, University of California; Aug. 1992 (47 pages).

* cited by examiner

EVALUATION OF CEMENT SHEATH DAMAGE IN UNDERGROUND STORAGE CAVITY DURING EARTHQUAKE

BACKGROUND

Underground salt caverns have been used to store natural gas for many decades. The impermeable nature of the salt formation provides an ideal environment for gas storage, allowing for minimal amounts of gas to escape by means other than purposeful extraction through a well system. Additionally, salt caverns offer a higher deliverability rate and lower cushion gas requirement than alternative underground gas storage options, such as aquifers and depleted gas reservoirs. Due to these benefits, salt caverns may become the primary means of storage for carbon dioxide ($CO_2$) sequestration and hydrogen ($H_2$) as a strategic resource.

An underground salt cavern is created by drilling a wellbore into a salt bed or salt dome and installing a casing-cement-rock well system through which hot water is injected and circulated into the salt deposit. As the salt dissolves, the brine is removed through the well, and a cavern is formed as a result. The final shape of the cavern depends upon many factors such as depth and location of the cavern, the composition of the geologic layers, and the technology used to create the cavern. As a result, salt caverns can have different depths, shapes, and volumes. Gas is then injected into and withdrawn from the salt cavern via the casing-cement-rock well system. The gas is stored under high pressure and can be cycled numerous times per year.

SUMMARY

This summary is provided to introduce a selection of concepts that are further described in the detailed description. This summary is not intended to identify key or essential features of the claimed subject matter, nor is it intended to be used as an aid in limiting the scope of the claimed subject matter.

In one aspect, embodiments disclosed herein relate to a method for evaluating potential damage to a cement sheath in an underground gas storage facility during an earthquake. The method includes obtaining a plurality of data points related to one or more static and dynamic mechanical properties of a casing-cement-rock well system, obtaining a ground surface earthquake (EQ) wave, and performing a deconvolution analysis on the ground surface EQ wave to produce a subsurface EQ wave. The method further includes generating a computational model of the casing-cement-rock well system and an underground storage cavern, wherein the computational model includes an upper surface, one or more lateral surfaces, and a lower surface, and wherein a roller boundary is applied to the lower surface. The method further includes applying a first gas pressure value to the computational model, and, using the computational model, simulating a first static equilibrium state based on the first gas pressure value. The method further includes applying a quiet boundary to the upper surface and the one or more lateral surfaces of the computational model and using the computational model for simulating a first dynamic seismic event based on the first gas pressure value and the subsurface EQ wave, continuously evaluating a first effect of the first dynamic seismic event on a first integrity of the casing-cement-rock well system and the underground storage cavern. The method further includes adjusting at least one parameter related to an operation of the underground gas storage facility based on the first effect of the first dynamic seismic event on the first integrity of the casing-cement-rock well system and the underground storage cavern.

Other aspects and advantages of the claimed subject matter will be apparent from the following description and the appended claims.

BRIEF DESCRIPTION OF DRAWINGS

Specific embodiments of the disclosed technology will be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility.

DETAILED DESCRIPTION

Figure 1:
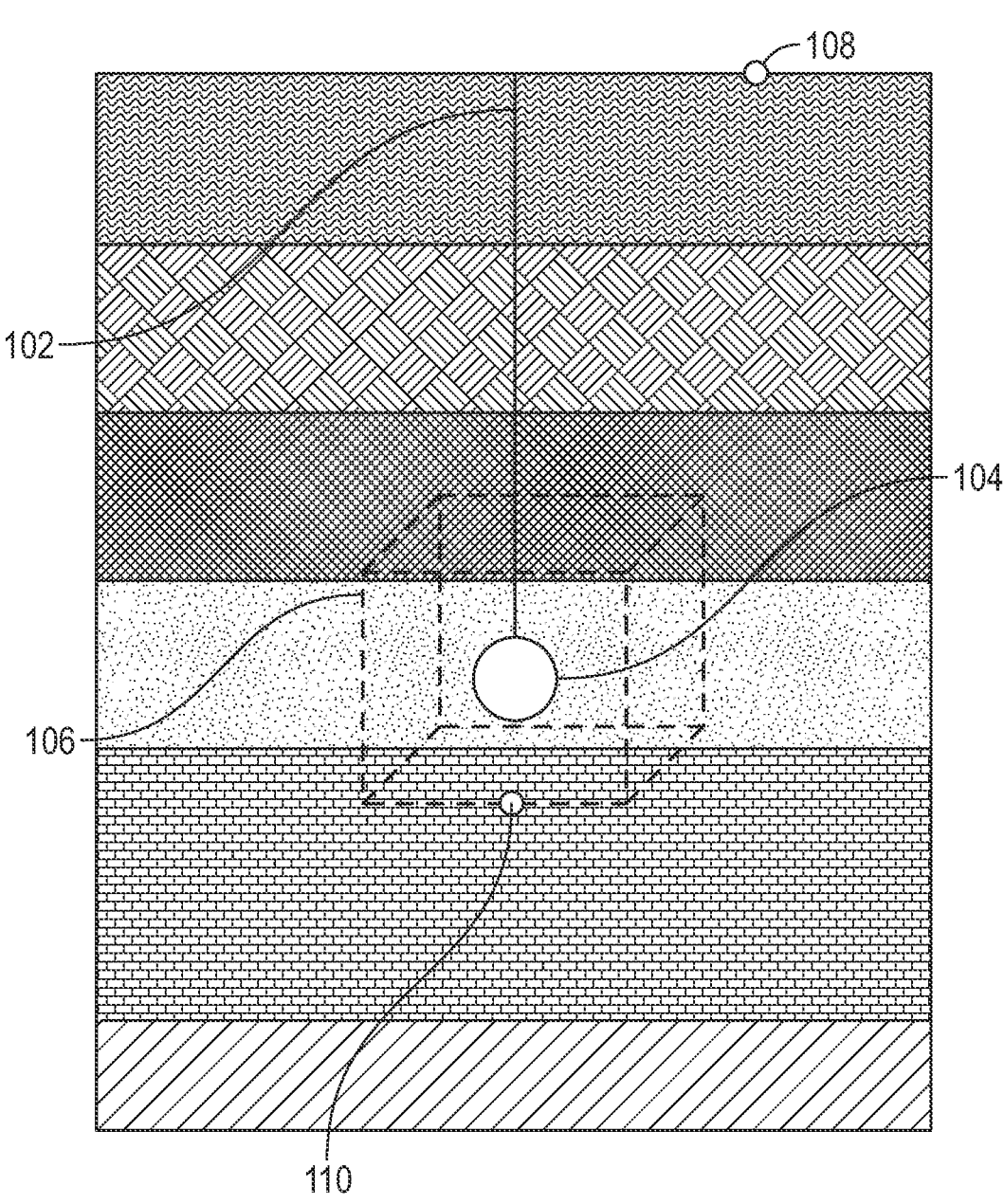
FIG. 1 illustrates an underground gas storage facility in accordance with one or more embodiments of the present disclosure.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

In general, embodiments of the disclosure include a method for evaluating the potential damage to the cement sheath in an underground gas storage facility during a seismic event. To evaluate potential damage, a modelling process can be used. In some embodiments, the deformation and integrity of the underground gas storage facility, including casing-cement-rock well and underground storage cavern, is evaluated in equilibrium under loads of in-situ stresses and gas pressure inside the cavern. In some embodiments, an earthquake (EQ) wave obtained from deconvolution analysis of the earthquake motion recorded at the ground surface is applied to a location beneath the underground storage cavern, and the deformation and integrity of the underground gas storage facility, including casing-cement-rock well and underground storage cavern, is evaluated. To this end, the method provides a means to predict the integrity of the cement sheath and the casing-cement and cement-rock interfaces during seismic events.

In one or more embodiments, the static mechanical properties of cement, rock, and casing-cement and cement-rock bonding interfaces are measured through laboratory experiments. Both cement and rock can be appropriately modeled as Mohr-Coulomb type elastoplastic materials. Static mechanical properties include stiffness and strength of the material. Stiffness properties, such as Young's modulus and Poisson's ratio, link stress with deformation. Strength properties, such as cohesion, friction angle, dilation angle, and tensile strength, define the loading limits in various failure modes.

Measurement of these static mechanical properties can be obtained by performing analysis on core plugs or by indentation testing on small material pieces in a conventional rock lab. The shear strength properties of a casing-cement and cement-rock interface can be measured using a direct shear test. This test involves applying a vertical load and a horizontal shear force to a specimen which has been placed in a shear box. The tensile strength properties of a casing-cement and cement-rock interface can be measured by a direct tensile test. In a direct tensile test, a specimen is pulled at two ends until the specimen is pulled apart while the pulling force and displacement are monitored. The peak force divided by the cross-section perpendicular to the pulling direction is the tensile strength. Tensile strength can also be measured using the Brazilian disc compression test, in which a thin circular disc is diametrically compressed to failure.

Possible failure modes that can occur to a cement sheath in a casing-cement-rock well system include inner debonding, outer debonding, shear damage, radial cracking, and disking. Examples of possible failure modes that can occur to an underground storage cavern during a seismic event are compressive shear yielding as described by the Mohr-Coulomb failure criterion, tensile cracking, and volume collapse.

In one or more embodiments, the dynamic mechanical properties of casing, cement, rock, and casing-cement and cement-rock bonding interfaces are measured through laboratory experiments. The capture of these dynamic mechanical properties is useful in the seismic analysis of the system as they will affect the deformation, stressing, and damage of the casing, cement, rock, and casing-cement and cement-rock bonding interfaces.

The dynamic mechanical property of shear modulus (G)—also known as the modulus of rigidity—is the ratio of shear stress to shear strain. The dynamic mechanical property of damping ratio (D) is a measure that describes the rate of decay of oscillations in a system following a disturbance, such as a seismic event. Under high frequency loading conditions, such as that experienced during a seismic event, as the magnitude of cyclic shear strain ($\gamma_C$) increases, the shear modulus (G) of cement and rock will decrease, and the damping ratio (D) of cement and rock will increase. This behavior can be characterized by modulus reduction and damping ratio curves. The resonant column (RC) and the cyclic torsional shear (CTS) tests can be used to measure shear modulus (G) and damping ratio (D) in a laboratory using RTCS (resonant column and torsional shear) equipment.

In one or more embodiments, an EQ wave during a seismic event can be recorded at the ground surface. In some embodiments, the EQ wave can be a recording of a historic seismic event at or near the location of the underground gas storage facility being evaluated.

Underground storage caverns are located at deep subsurface. Therefore, to simulate the response of an underground gas storage facility to a seismic event, the seismic excitation provided by the obtained EQ wave should be applied to a location beneath the underground storage cavern.

In one or more embodiments, if the thickness and elastic properties of the geological layers surrounding the underground gas storage facility are known, the appropriate seismic motion at depth can be obtained by deconvoluting the ground surface EQ wave through the geologic layers to the desired subsurface depth, thereby simulating a subsurface EQ wave. The resulting subsurface EQ wave can then be used to effectively simulate a seismic event by supplying the subsurface EQ wave to a location beneath the underground storage cavern.

Deconvolution is a type of analysis performed in the frequency domain which converts an earthquake wave recorded at one point in the time domain to the simultaneous earthquake wave expected at a different point in the time domain. Deconvolution analysis can be done through EQ wave propagation software that allows engineers and researchers to qualitatively assess the influence of geologic layers of varying stiffness on the propagated ground motion during a seismic event. Examples of programs used for deconvolution analysis include SHAKE (UC Berkeley) and its variants, such as SHAKE91, and DEEPSOIL (University of Illinois Urbana-Champaign).

In one or more embodiments, a computational model of the underground gas storage facility is built. The static mechanical properties of casing, cement, rock, and casing-cement and cement-rock bonding interfaces that were previously discussed are input into the computational model. The model includes an upper surface, one or more lateral surfaces, and a lower surface. A first stress boundary condition is enforced at the upper surface, and a second stress boundary condition is enforced at one or more lateral surfaces. To prevent normal or vertical movement, a roller boundary is enforced along the lower surface. Lastly, a first gas pressure is assigned to the inside of the underground storage cavern on the computational model.

Figure 9:
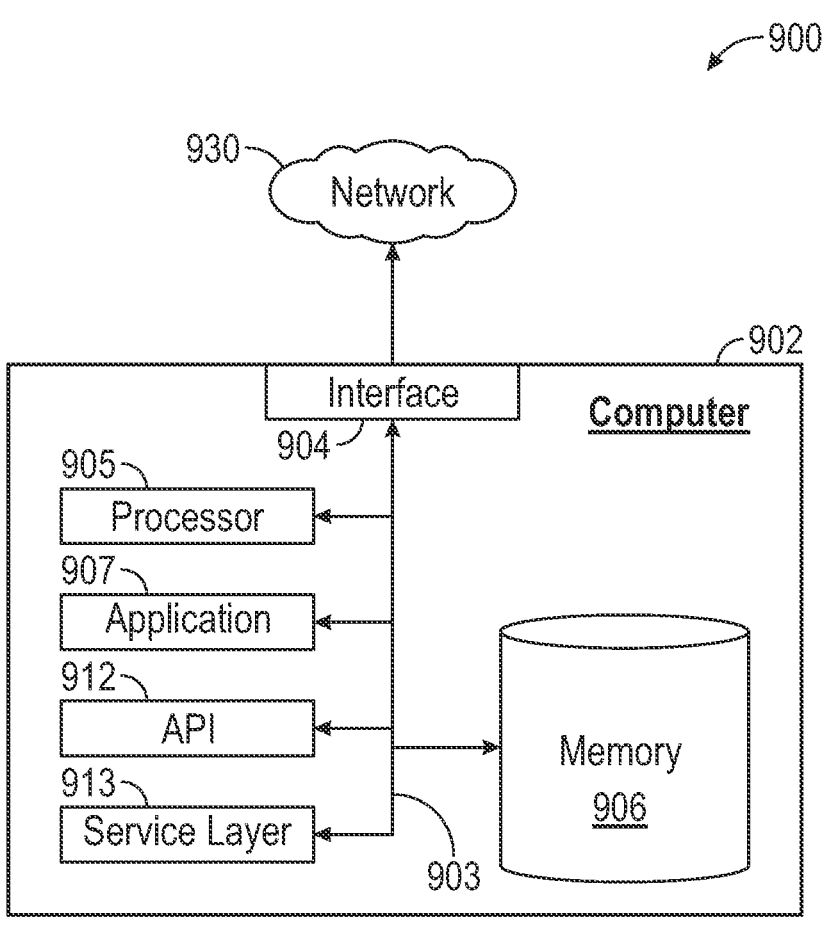
FIG. 9 shows a computing system in accordance with one or more embodiments of the present disclosure.

In some embodiments, the computational model can be simulated on a computer system that is similar to the computer system depicted in FIG. 9 and the accompanying description.

In one or more embodiments, the upper surface of the computational model is the top surface located above the underground storage cavern, the one or more lateral surfaces of the model are lateral surfaces located along the sides of the underground storage cavern, and the lower surface of the model is the bottom surface located beneath the underground storage cavern. The computational model may be built on top of or using existing computational geomechanics software known to those of ordinary skill in the art.

Overburden is the pressure, or vertical stress, experienced at a given depth due to the total weight of the overlying geologic materials above that depth. When overburden applies vertical pressure to a region from above, the affected region will react by pushing horizontally into the surrounding geologic materials. This horizontal pressure results in horizontal stress. To simulate these conditions on the computational model, in one or more embodiments, the first stress boundary condition enforced at the upper surface is overburden ($\sigma_v$), and the second stress boundary condition enforced at the one or more lateral surfaces is horizontal stress ($\sigma_h$).

In one or more embodiments, the computational model is then modelled to a first static equilibrium state. During the static equilibrium simulation, the maximum unbalanced force can be monitored. At the conclusion of the static simulation, the distribution of stress and shear strain can be noted, in addition to the behavior of the mechanically damaged zones. The resulting model is a representation of the initial state of the underground gas storage facility prior to a seismic event.

In one or more embodiments, certain properties in the computational model are then modified to simulate the response of the system to a seismic event, resulting in a dynamic analysis model. To simulate the first dynamic seismic event, the roller boundary is removed from the lower surface of the computational model. Additionally, a quiet boundary is applied to the upper surface and one or more lateral surfaces of the computational model. The enforcement of a quiet boundary serves to absorb the simulated EQ wave, stopping the wave from propagating outwards from the computational model and thereby eliminating artificial wave reflection. The dynamic mechanical properties of modulus reduction and damping ratio previously discussed are assigned to the rock and cement components on the computational model, such that their hysteretic responses can be captured during the duration of the simulated seismic event. Lastly, and most advantageously, the subsurface EQ wave is applied to the lower surface of the computational model. In one or more embodiments, the subsurface EQ wave is applied beneath the underground storage cavern.

In one or more embodiments, once the dynamic analysis model is in place, the simulation of the seismic event can proceed. The model will be run through the duration of the EQ wave, driven by the excitation of the subsurface EQ wave applied to the lower surface of the computational model. The stress, strain, velocity, displacement, deformation, and damage will be calculated and recorded for each element of the underground gas storage facility by measuring every grid point on the computational model during each time step of the simulated seismic event. At the end of the simulation, which corresponds to the end of the first dynamic seismic event, the damage effect to all of the elements of the underground gas storage facility (e.g., the damage around the cavity, damage around wellbore, damage in the cement, casing, rock mass, and the damage in casing/cement and cement/rock interfaces) is assessed using the recordings measured during the simulated seismic event. Based on the first effect of the first dynamic seismic event on the first integrity of the underground gas storage facility, at least one parameter related to the operation of the underground gas storage facility can be adjusted.

The gas pressure inside an underground storage cavern is cyclic. As gas is injected into the underground storage cavern through the casing-cement-rock well system, the gas pressure increases. As gas is withdrawn from the underground storage cavern through the casing-cement-rock well system, the gas pressure decreases. For example, the typical cyclic pressure fluctuation in an underground salt cavern while storing natural gas can be in the order of a few hundred pounds per square inch (psi). This pressure fluctuation can have a significant impact on the stability and integrity of the underground gas storage facility. Therefore, in some embodiments, it is advantageous to model the underground gas storage facility using different representative gas pressure values, for example, the maximum, minimum, and average gas pressure recorded historically inside the underground storage cavern. Consequently, the seismic response of the underground gas storage facility can be evaluated under different representative gas pressure values.

Accordingly, the method can be used to optimize the design of underground gas storage facilities, such as those utilizing salt caverns, depleted gas reservoirs, and aquifers. Of principal concern is the stability and integrity of the cement sheath and casing-cement and cement-rock interfaces during a seismic event at the site. The cement sheath and casing-cement and cement-rock interfaces are highly susceptible to mechanical damage during seismic events. The failure of these elements due to a seismic event could result in the escape of high-pressure gas, causing safety and environmental hazards. The measurements taken of these elements during the previously discussed simulated seismic event can be used, for example, to optimize the cement selection during the design of the cement sheath of the underground gas storage facility. Additionally, in some embodiments, recommendations can be made as to the stiffness, strength, and thickness of the casing material used in the casing-cement-rock well system. The size and shape of the underground storage cavern can also be optimized based upon the measurements taken during the simulated seismic event.

As discussed, in one or more embodiments, the method can predict the integrity and stability of the underground storage cavern and casing-cement-rock well system during a seismic event. Using historical EQ wave data, the EQ wave is deconvoluted to a subsurface location and applied to a location beneath the underground storage cavern. To this end, evaluating the behavior of the system to the seismic event will identify problem areas that can then be strengthened in the design of the underground storage cavern and casing-cement-rock well system.

In one or more embodiments, the method can be performed on an existing underground gas storage facility to calculate a safe operating gas pressure window. This is done by performing sensitivity analysis on the gas pressure of the underground storage cavern. The method can be repeated using a plurality of gas pressures to determine a minimum and maximum safe operating gas pressure window.

FIG. 1 shows a diagram of an underground gas storage facility 100, according to one or more example embodiments. As shown in FIG. 1, an underground gas storage facility 100 includes an underground storage cavern 104 connected to a casing-cement-rock well system 102. Gas is injected and withdrawn from the underground storage cavern 104 using the casing-cement-rock well system 102. Different geologic layers of the site surrounding the underground storage cavern 104 and casing-cement-rock well system 102 are indicated by varied crosshatch patterns on FIG. 1. A ground surface location 108 indicates a location where a ground surface EQ wave was recorded. A subsurface location 110 indicates a location beneath the underground storage cavern 104 where the ground surface EQ wave is deconvoluted to and applied for dynamic seismic analysis. The region 106 surrounding the underground storage cavern 104 illustrates the region where a computational model of the underground gas storage facility 100 will be simulated. Region 106 is enlarged and further presented in FIGS. 7A and 7B.

Figures 2A, 2B, 2C:
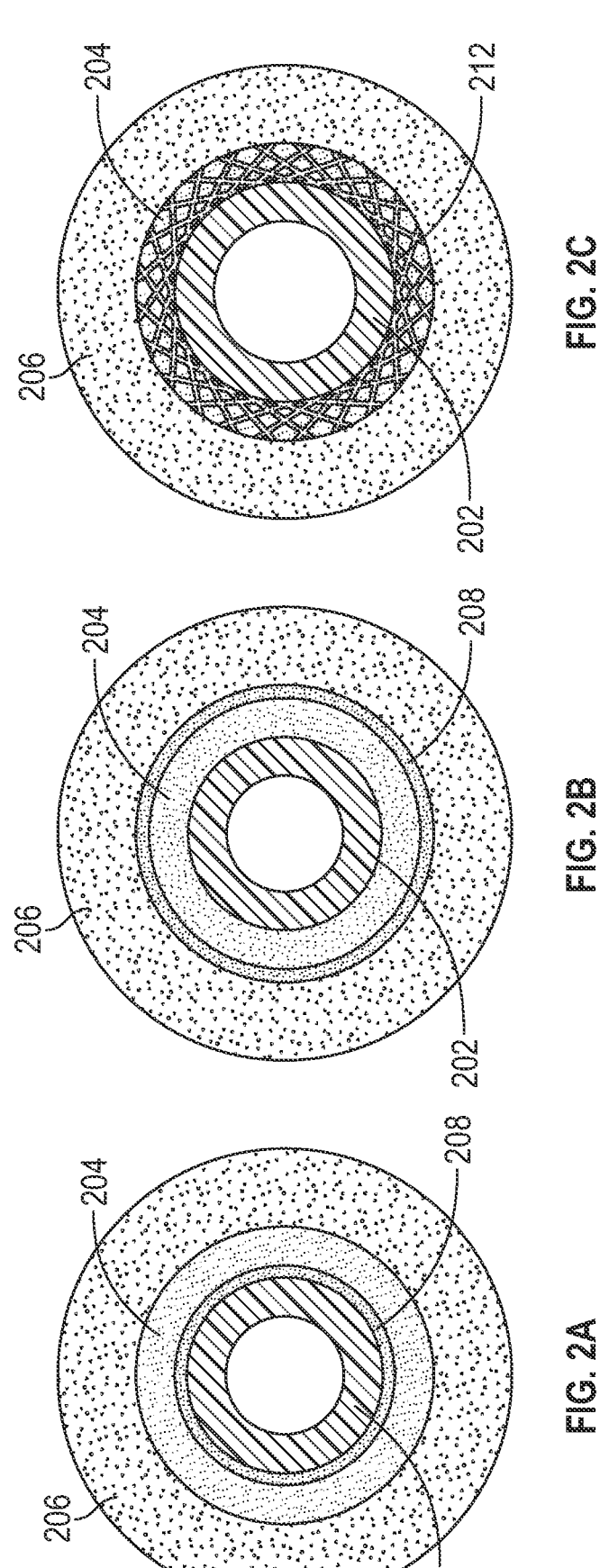
FIGS. 2A-2E illustrate various mechanical failure modes of a cement sheath in accordance with one or more embodiments of the present disclosure.
Figure 2D:
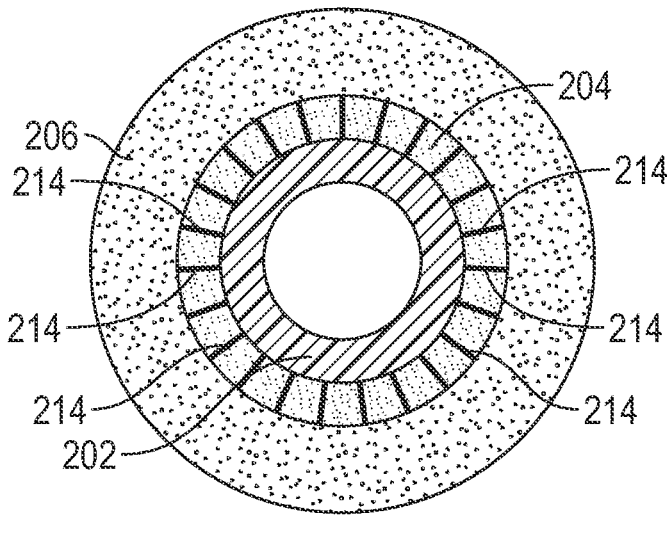
Figure 2E:
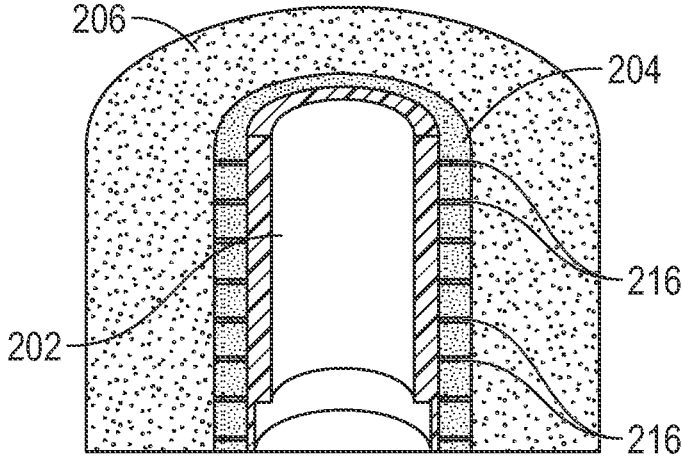

FIGS. 2A-2E show examples of failure modes, or types of damage, that a cement sheath 204 in a casing-cement-rock well system 102 (FIG. 1) may experience under various loading and deformation conditions that can occur during a seismic event. FIGS. 2A-2D show enlarged radial cross-sectional portions of the casing-cement-rock well system 102 (FIG. 1). FIG. 2E shows an enlarged longitudinal cross-sectional portion of the casing-cement-rock well system 102 (FIG. 1). Any damage to the cement sheath 204 due to the failure modes in FIGS. 2A-2E may provide channels through which the gas stored in the underground storage cavern 104 can escape.

FIG. 2A shows the inner debonding 208 that may occur at the casing-cement interface when the casing 202 contracts more than the cement sheath 204. Likewise, FIG. 2B shows the outer debonding 210 that may occur at the cement-rock interface when the cement sheath 204 contracts more than the rock formation 206. FIG. 2C shows compressive shearing 212 yielding induced damage that may occur inside the cement sheath 204 if the deviatoric stress is large enough to exceed the shearing strength of the cement sheath 204. FIG. 2D shows a tensile damage mode known as radial cracking 214 that may occur if the inner pressure of the cement sheath 204 is larger than the outer pressure of the cement sheath 204, similar to the concept of a pipe bursting. Likewise, FIG. 2E shows another tensile damage mode called disking 216 that takes place in the axial direction. Disking may occur when the cement sheath 204 contracts axially but is unable to slide along the cement-rock interface.

Figure 3:
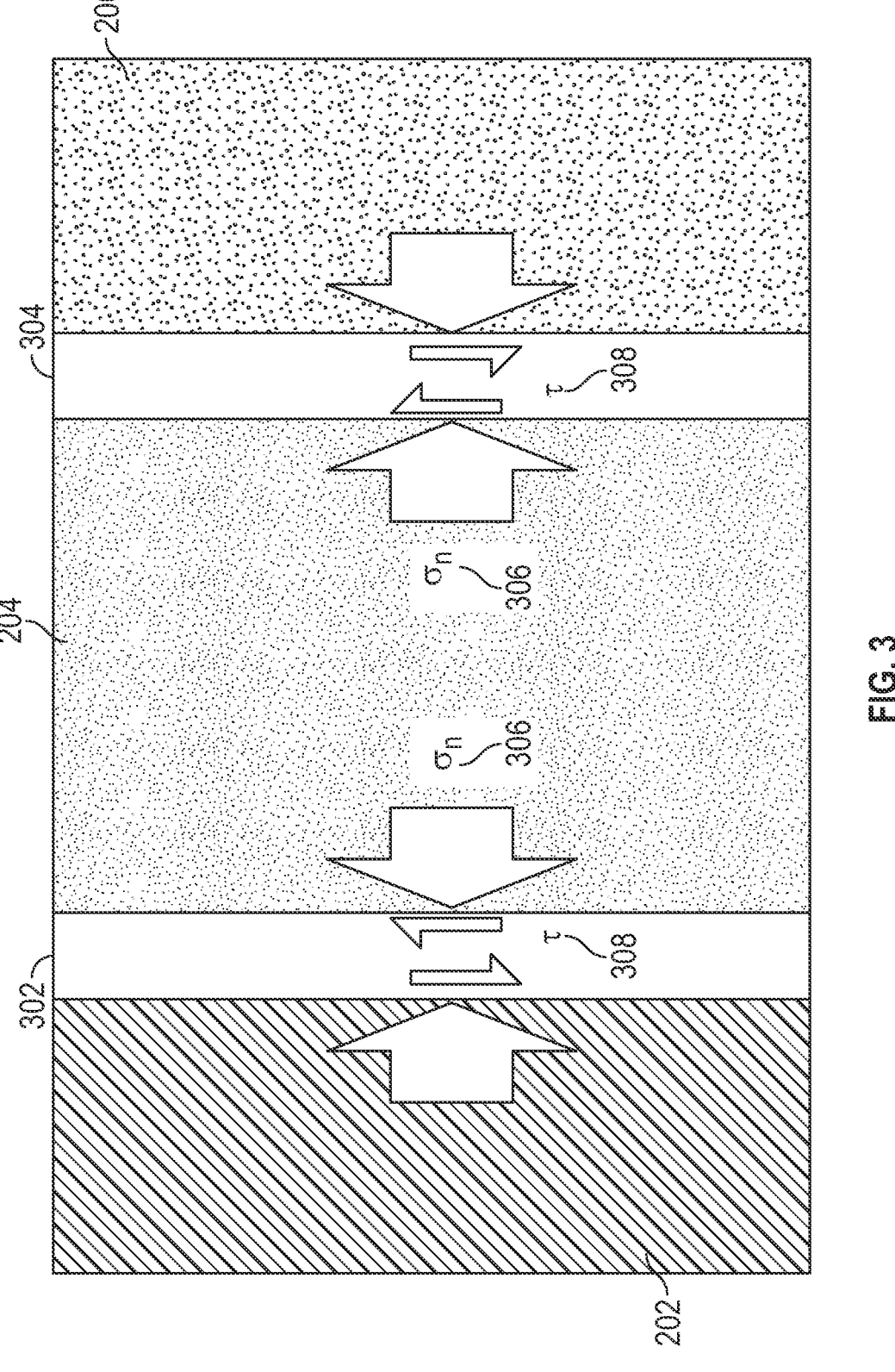
FIG. 3 illustrates the stressing of the interfaces between casing, cement sheath, and rock formation of a casing-cement-rock well system in accordance with one or more embodiments of the present disclosure.

FIG. 3 shows an enlarged portion of a casing-cement-rock well system 102 (FIG. 1). The casing-cement interface 302 is shown encased between a casing 202 and a cement sheath 204. The cement-rock interface 304 is shown encased between a cement sheath 204 and a rock formation 206. The casing-cement interface 302 and cement-rock interface 304 of a casing-cement-rock well system 102 (FIG. 1) may be damaged in both shearing and tensile modes, as illustrated in FIGS. 2A-2E. As shown in FIG. 3, relative movement of material on the sides along an interface can generate shear stress 308 τ along the interface. The relative movement of material on the two sides normal to an interface will change the normal stress 306 $\sigma_n$ acting on an interface. Note that the shear stresses 308 τ and normal stresses 306 $\sigma_n$ acting on the casing-cement interface 302 and cement-rock interface 304 are not necessarily equivalent.

In the shearing direction, the failure that can occur along the interfaces may be described as follows by the Mohr-Coulomb failure criterion in Equations (1)-(3):

$$\tau \le \tau^S \qquad \text{Equation (1)}$$

where, in Equation (1), T is the shear stress 308 on the interface; $\tau^s$ is the shear strength of the interface:

$$\tau^S = c + \sigma_n \tan(\varphi) \qquad \text{Equation (2)}$$

where, in Equation (2), c is the cohesive bonding strength and φ is the friction angle on the interface; $\sigma_n$ is the confining stress normal to the interface, which is positive in compression. After the shearing damage, shear displacement will introduce an increment in normal stress 306 due to dilatancy:

$$\Delta\sigma_n = K_n \gamma_P \tan\psi \qquad \text{Equation (3)}$$

where, in Equation (3), $\gamma_P$ is the plastic shear strain on the interface; ψ is the dilation angle; $K_n$ is the normal stiffness of the interface; $\Delta\sigma_n$ is the increase of normal stress due to dilatancy.

In the normal direction, the failure occurs when the normal stress 306 on the interfaces becomes tensile and exceeds the tensile strength:

$$-\sigma_n \ge T \qquad \text{Equation (4)}$$

where, in Equation (4), T is the tensile strength of the interface.

Figures 4, 5:
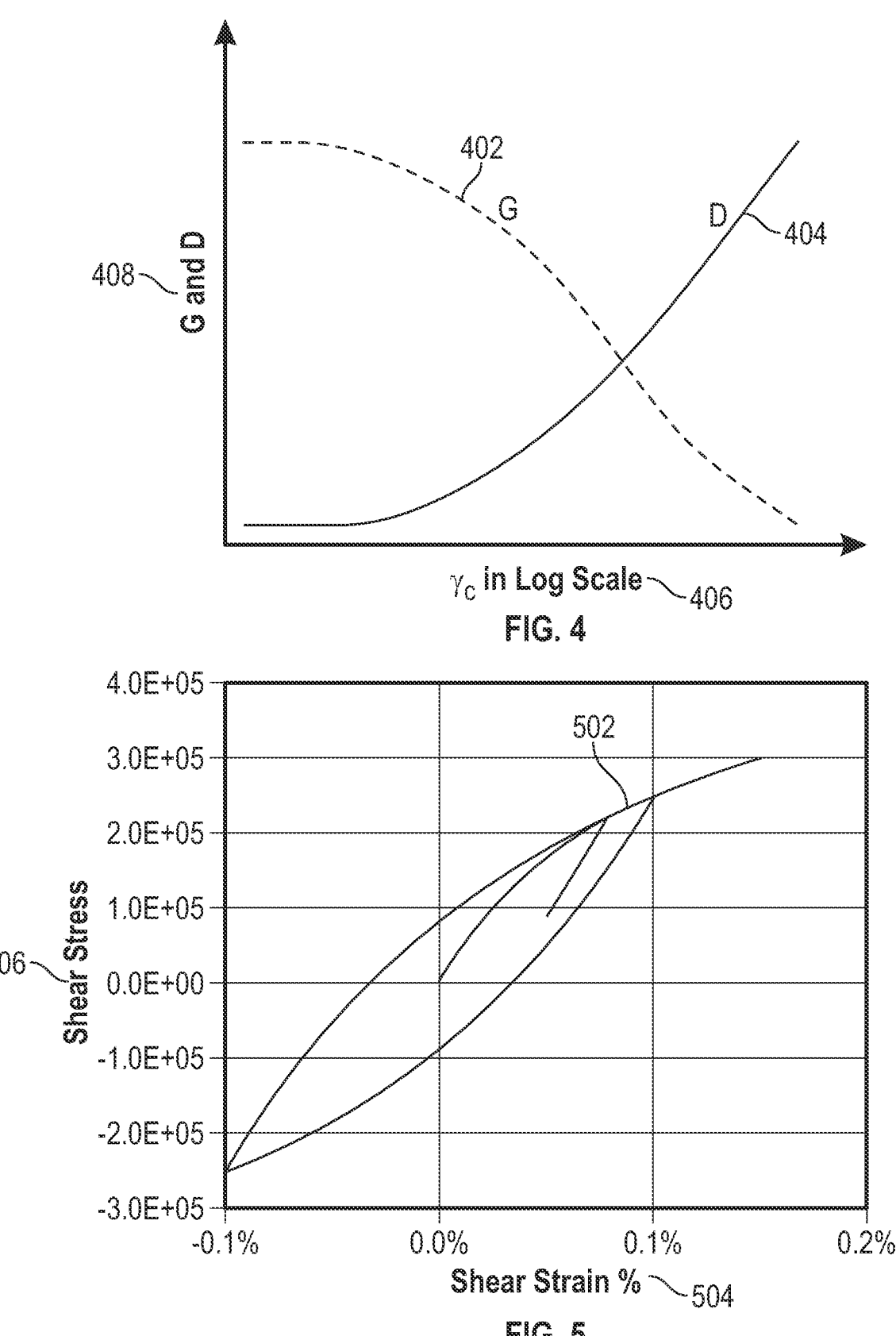
FIG. 4 is a graph of modulus reduction and damping ratio curves of soil and rock materials in accordance with one or more embodiments of the present disclosure.
FIG. 5 is a graph of the seismic response of geologic materials due to strain-dependent modulus reduction and damping ratio in accordance with one or more embodiments of the present disclosure.

FIG. 4 shows a simplified graph illustrating the behavior of the dynamic mechanical properties of shear modulus (G) and damping ratio (D) when experiencing cyclic shear strain ($\gamma_C$). The x-axis 406 is cyclic shear strain ($\gamma_C$) in log scale. The y-axis 408 is shear modulus (G) and damping ratio (D). Under high-frequency cyclic loading conditions like that experienced during a seismic event, as the magnitude of cyclic shear strain ($\gamma_C$) increases, the shear modulus (G) of cement and rock will decrease, while the damping ratio (D) of cement and rock will increase. This behavior is commonly characterized by modulus reduction 402 and damping ratio curves 404, as illustrated in FIG. 4.

FIG. 5 shows a graph illustrating an example of the typical stress-strain response 502 of geologic materials under high-frequency cyclic loading conditions like that experienced during a seismic event. The x-axis is the percentage of shear strain 504. The y-axis is shear stress 506. This information is obtained by performing a cyclic loading test in which a specimen is loaded by a full cyclic load with some unloading-reloading excursions. This behavior can then be reproduced by applying the dynamic mechanical properties of modulus reduction and damping ratio to cement and rock elements in the dynamic analysis computational model and simulating a seismic event, as previously discussed.

Figures 6A, 6B:
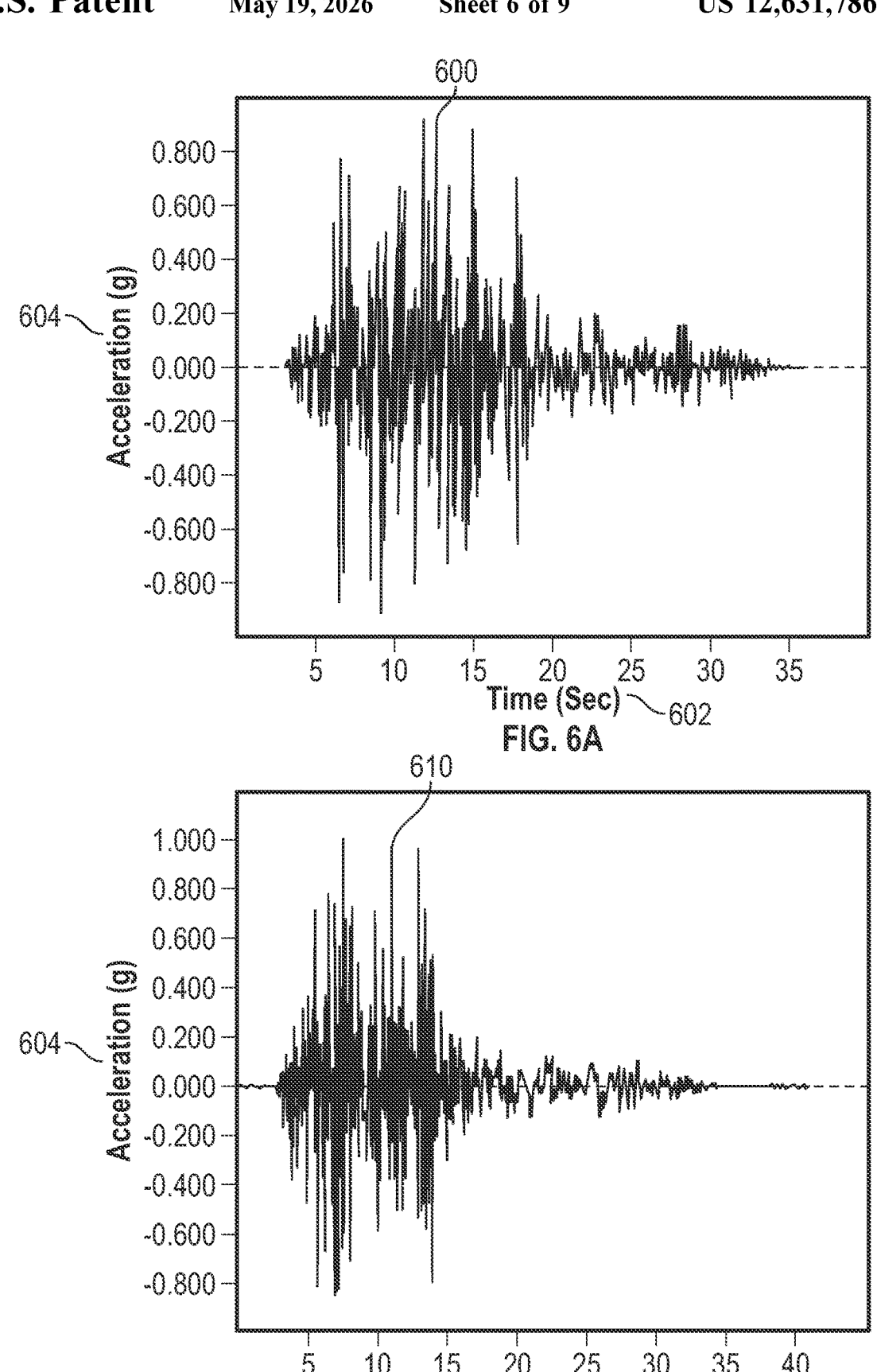
FIG. 6A is a graph of earthquake motion at a ground surface recorded during an earthquake in accordance with one or more embodiments of the present disclosure.
FIG. 6B is a graph of the earthquake motion at a subsurface produced through deconvolution analysis from a ground surface motion recorded during an earthquake in accordance with one or more embodiments of the present disclosure.

FIG. 6A shows a graph of a ground surface EQ wave 600 recorded at a ground surface location 108 (FIG. 1). The x-axis 602 is time measured in seconds. The y-axis 604 is acceleration measured in gravitational acceleration (g). In some embodiments, ground surface location 108 (FIG. 1) is located at or near the underground gas storage facility 100 (FIG. 1) and the recorded ground surface EQ wave 600 is a historic EQ wave that was recorded at or near ground surface location 108 (FIG. 1).

FIG. 6B shows a graph of a subsurface EQ wave 610. The x-axis 602 is time measured in seconds. The y-axis 604 is acceleration measured in gravitational acceleration (g). Underground storage caverns are located at a given depth, therefore, to adequately simulate the response of an underground gas storage facility 100 (FIG. 1) to a seismic event, the earthquake excitation should be supplied to a location beneath the underground storage cavern 104 (FIG. 1), such as subsurface location 110 (FIG. 1). This is done through EQ wave deconvolution. The ground surface EQ wave 600 in FIG. 6A was recorded at a ground surface location 108 (FIG.

1) and deconvoluted to a subsurface location 110 (FIG. 1), resulting in the subsurface EQ wave 610 shown in FIG. 6B.

In order for the ground surface EQ wave 600 recorded at ground surface location 108 (FIG. 1) to be deconvoluted to subsurface location 110 (FIG. 1), the thickness and elastic properties of the geological layers surrounding the underground gas storage facility 100 (FIG. 1) must be known. Once these geologic properties are obtained, subsurface EQ wave 610 can be obtained through deconvolution analysis provided by software such as SHAKE and DEEPSOIL, as previously described.

Figures 7A, 7B:
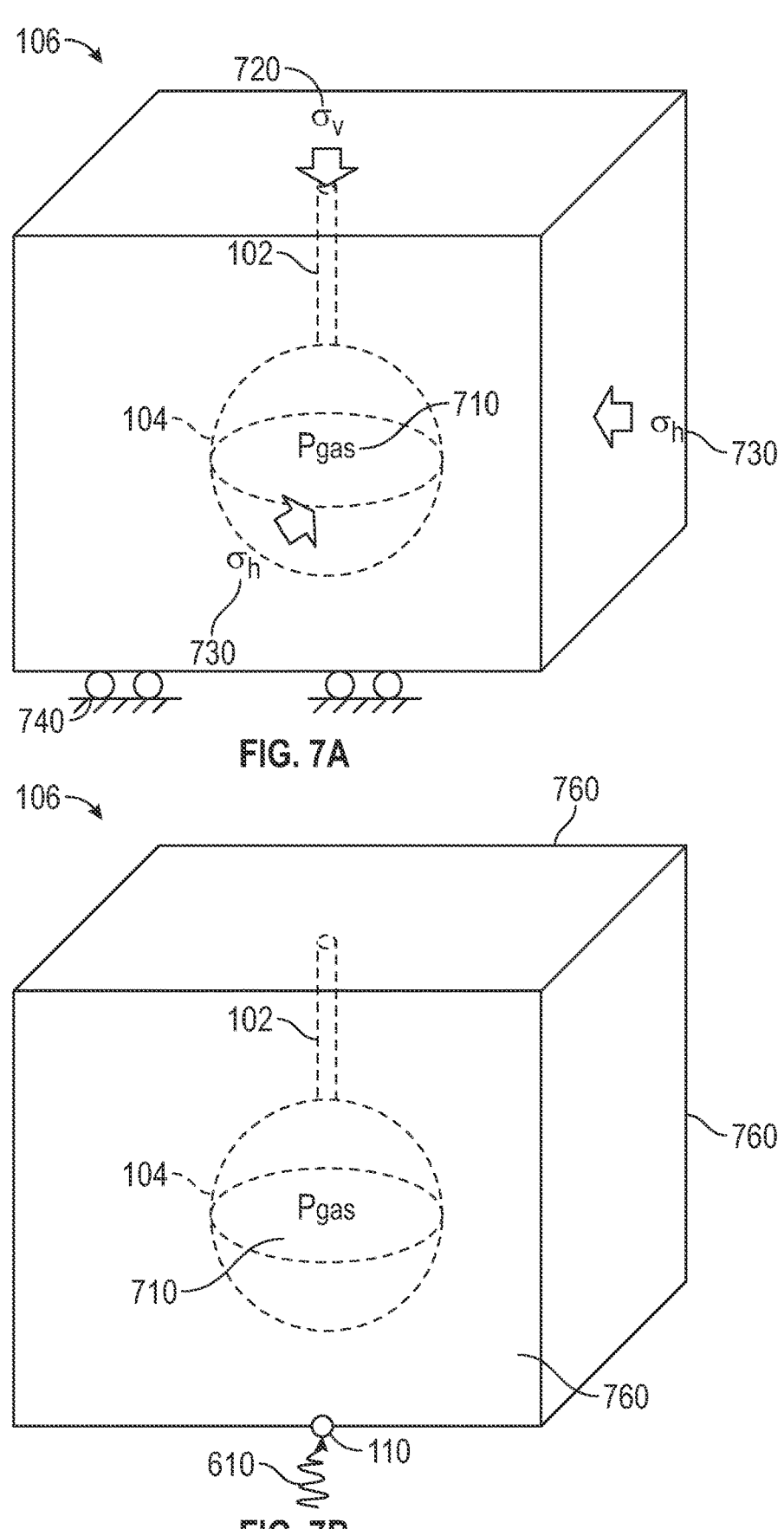
FIG. 7A illustrates a static equilibrium model in accordance with one or more embodiments of the present disclosure.
FIG. 7B illustrates a dynamic analysis model in accordance with one or more embodiments of the present disclosure.

FIG. 7A shows an embodiment of an enlarged region 106 on which a computational model of the underground gas storage facility 100 (FIG. 1) is simulated. Region 106 includes an underground storage cavern 104 and a casing-cement-rock well system 102. The static mechanical properties of casing, cement, rock, and casing-cement and cement-rock bonding interfaces are input into the computational model.

The computational model is then modelled to a first static equilibrium state which represents the initial state of the underground gas storage facility 100 (FIG. 1) before a seismic event takes place. To achieve a state of static equilibrium, the model is loaded by a first stress boundary condition assigned as overburden 720 ($\sigma_v$) on the top surface and a second stress boundary condition assigned as horizontal stress 730 ($\sigma_h$) at one or more lateral surfaces of the model. A roller boundary 740 is enforced along the bottom surface of the model to prevent movement in the normal direction. Lastly, a first gas pressure 710 ($P_{gas}$) is selected and applied inside the underground storage cavern 104.

FIG. 7B shows an embodiment of region 106 in dynamic analysis mode wherein the model is prepared to simulate the first dynamic seismic event. The dynamic mechanical properties modulus reduction (G) and damping ratio (D) are assigned to the cement and rock components of the computational model such that their hysteretic responses can be captured during the duration of the simulated seismic event. Additionally, the roller boundary 740 (FIG. 7A) is removed from the bottom surface of the model, and a quiet boundary 760 is enforced at the top surface location and one or more lateral surfaces to absorb the EQ wave as the wave propagates outward. Lastly, the subsurface EQ wave 610 is applied to the subsurface location 110, beneath the underground storage cavern 104.

Those skilled in the art will appreciate that when switching from dynamic to static analysis, the dynamic boundary condition is replaced by static boundary condition. Dynamic mechanical properties do not need to be removed; instead, they can be stored in the model but are not used in static analysis.

Figure 8:
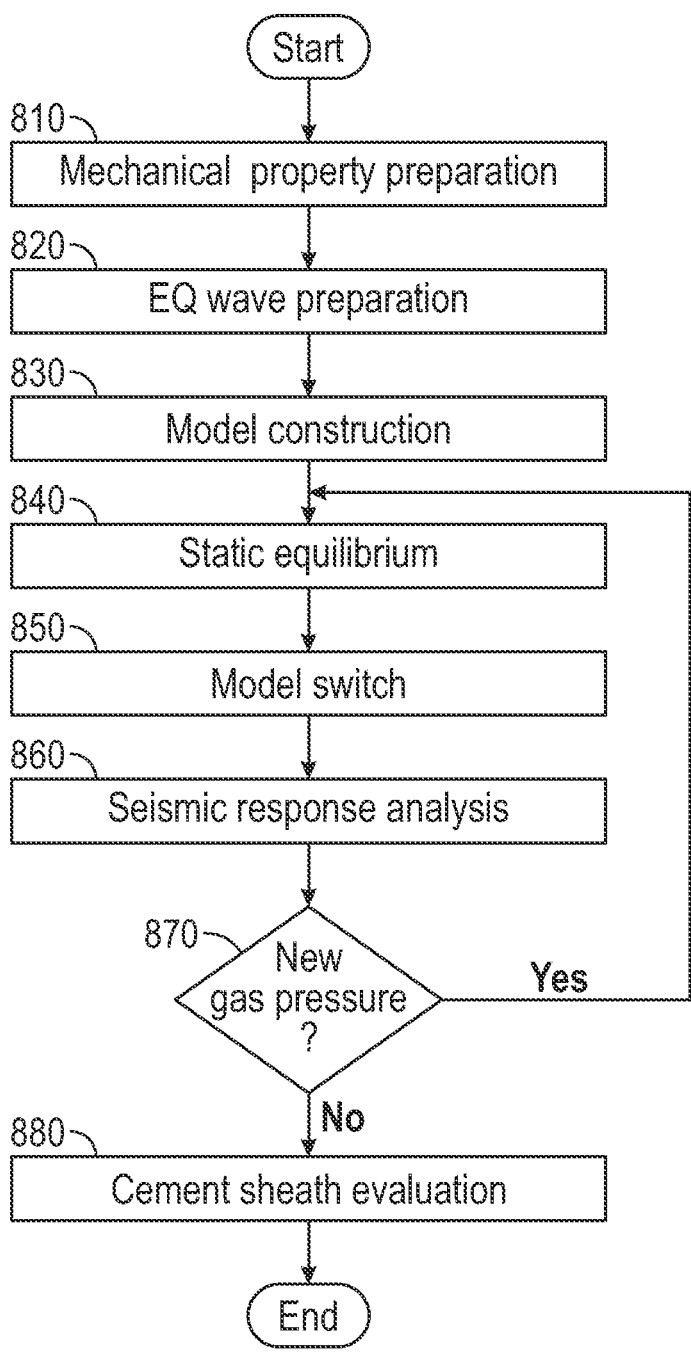
FIG. 8 is a flowchart of a method in accordance with one or more embodiments of the present disclosure.

FIG. 8 shows a flowchart in accordance with one or more embodiments. FIG. 8 describes a method for evaluating the potential damage to a cement sheath in an underground gas storage facility during a seismic event. While the various blocks in FIG. 8 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 810, an underground gas storage facility, such as that shown in FIG. 1, is chosen for evaluation, and the static and dynamic mechanical properties of casing, cement, rock, and casing-cement and cement-rock interfaces of the facility are measured and recorded. FIGS. 2A-2E show various mechanical failure modes experienced by a cement sheath during a seismic event. An enlarged view of a casing-cement-rock well system, shown in FIG. 3, combined with Equations 1-4 illustrate how the static mechanical properties of stiffness, such as Young's modulus and Poisson's ratio, and strength, such as cohesion, friction angle, dilation angle, and tensile strength, can contribute to the failure of a cement sheath, such as those described in FIGS. 2A-2E. Dynamic mechanical properties of cement and rock, in particular shear modulus (G) and damping ratio (D), are shown in FIG. 4 under a high-frequency loading condition. FIG. 5 goes on to show the seismic response of geologic materials due to strain-dependent modulus reduction and damping ratio.

In Block 820, an EQ wave is recorded at a ground surface location and deconvoluted to a subsurface location beneath the underground storage cavern. An example of a ground surface EQ wave is shown in FIG. 6A. The ground surface EQ wave is deconvoluted to a subsurface location as shown in FIG. 6B. To accurately predict the seismic behavior of the geologic area, it is advantageous to record a historic ground surface EQ wave at or near the location of the underground gas storage facility being evaluated.

In Block 830, a computational model is built to represent the underground gas storage facility. The static mechanical properties of casing, cement, rock, and casing-cement and cement-rock interfaces are input into the computational model. Additionally, a first stress boundary condition, such as overburden, is enforced at an upper surface, and a second stress boundary condition, such as horizontal stress, is enforced at one or more lateral surfaces. A roller boundary is applied to a lower surface, for example, beneath the underground storage cavern. An example of this computational model, in addition to the steps of Block 840, is shown in FIG. 7A.

In Block 840, a first gas pressure level is selected and applied to the underground storage cavern on the computational model. Then the computational model is calculated to a first static equilibrium state, which represents the initial state of the underground gas storage facility before a seismic event takes place. An example of this computational model is shown in FIG. 7A.

In Block 850, certain properties in the computational model are modified to simulate the response of the system to a first dynamic seismic event, resulting in a dynamic analysis model. In particular, the dynamic mechanical properties of modulus reduction and damping ratio are assigned to the cement and rock components of the computational model. In addition, the roller boundary is removed from the lower surface beneath the underground storage cavern, and a quiet boundary is enforced at the upper surface and one or more lateral surfaces. An example of this computational model, in addition to the steps of Block 860, is shown in FIG. 7B.

In Block 860, the subsurface EQ wave is applied to the lower surface beneath the underground storage cavern of the computational model. Then the dynamic seismic simulation is performed and the damage to the cement sheath and casing-cement and cement-rock interfaces is monitored and evaluated during the seismic event. An example of this computational model is shown in FIG. 7B.

In Block 870, a second gas pressure value may be selected, and Blocks 840-860 are repeated. It is advantageous to test the underground gas storage facility using different representative gas pressure values inside the underground storage cavern, for example, the maximum, minimum, and average gas pressure recorded historically inside the cavern. If all gas pressure values of interest have been investigated, the method proceeds to Block 880.

In Block 880, the integrity and stability of the cement sheath at all representative cavern gas pressure values is evaluated. Based on the observed effect, recommendations can then be proposed as to the well design or operation program. For example, the measurements taken of the underground gas storage facility elements during the simulated seismic event can be used to optimize the cement selection during the design of the cement sheath. Alternatively, or similarly, the pressure inside the underground storage cavern may be optimized based on the damage resulting from the simulated seismic event. Additionally, in some embodiments, adjustments can be made as to the stiffness, strength, and thickness of the casing material used in the casing-cement-rock well system. The size and shape of the underground storage cavern can also be optimized based upon the measurements taken during the simulated seismic event.

Embodiments of the computational model may be implemented on a computer system. FIG. 9 is a block diagram of a computer system 900 used to provide computational functionalities associated with described algorithms, methods, functions, processes, flows, and procedures as described in the instant disclosure, according to an implementation. The illustrated computer 902 is intended to encompass any computing device such as a high-performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 902 may include a computer that includes an input device, such as a keypad, keyboard, touch screen, or other device that can accept user information, and an output device that conveys information associated with the operation of the computer 902, including digital data, visual, or audio information (or a combination of information), or a GUI.

The computer 902 can serve in a role as a client, network component, a server, a database or other persistency, or any other component (or a combination of roles) of a computer system for performing the subject matter described in the instant disclosure. The illustrated computer 902 is communicably coupled with a network 930. In some implementations, one or more components of the computer 902 may be configured to operate within environments, including cloud-computing-based, local, global, or other environment (or a combination of environments).

At a high level, the computer 902 is an electronic computing device operable to receive, transmit, process, store, or manage data and information associated with the described subject matter. According to some implementations, the computer 902 may also include or be communicably coupled with an application server, e-mail server, web server, caching server, streaming data server, business intelligence (BI) server, or other server (or a combination of servers).

The computer 902 can receive requests over network 930 from a client application (for example, executing on another computer 902) and responding to the received requests by processing the said requests in an appropriate software application. In addition, requests may also be sent to the computer 902 from internal users (for example, from a command console or by other appropriate access method), external or third-parties, other automated applications, as well as any other appropriate entities, individuals, systems, or computers.

Each of the components of the computer 902 can communicate using a system bus 903. In some implementations, any or all of the components of the computer 902, both hardware or software (or a combination of hardware and software), may interface with each other or the interface 904 (or a combination of both) over the system bus 903 using an application programming interface (API) 912 or a service layer 913 (or a combination of the API 912 and service layer 913. The API 912 may include specifications for routines, data structures, and object classes. The API 912 may be either computer-language independent or dependent and refer to a complete interface, a single function, or even a set of APIs. The service layer 913 provides software services to the computer 902 or other components (whether or not illustrated) that are communicably coupled to the computer 902. The functionality of the computer 902 may be accessible for all service consumers using this service layer. Software services, such as those provided by the service layer 913, provide reusable, defined business functionalities through a defined interface. For example, the interface may be software written in JAVA, C++, or other suitable language providing data in extensible markup language (XML) format or other suitable format. While illustrated as an integrated component of the computer 902, alternative implementations may illustrate the API 912 or the service layer 913 as stand-alone components in relation to other components of the computer 902 or other components (whether or not illustrated) that are communicably coupled to the computer 902. Moreover, any or all parts of the API 912 or the service layer 913 may be implemented as child or sub-modules of another software module, enterprise application, or hardware module without departing from the scope of this disclosure.

The computer 902 includes an interface 904. Although illustrated as a single interface 904 in FIG. 9, two or more interfaces 904 may be used according to particular needs, desires, or particular implementations of the computer 902. The interface 904 is used by the computer 902 for communicating with other systems in a distributed environment that are connected to the network 930. Generally, the interface 904 includes logic encoded in software or hardware (or a combination of software and hardware) and operable to communicate with the network 930. More specifically, the interface 904 may include software supporting one or more communication protocols associated with communications such that the network 930 or interface's hardware is operable to communicate physical signals within and outside of the illustrated computer 902.

The computer 902 includes at least one computer processor 905. Although illustrated as a single computer processor 905 in FIG. 9, two or more processors may be used according to particular needs, desires, or particular implementations of the computer 902. Generally, the computer processor 905 executes instructions and manipulates data to perform the operations of the computer 902 and any algorithms, methods, functions, processes, flows, and procedures as described in the instant disclosure.

The computer 902 also includes a memory 906 that holds data for the computer 902 or other components (or a combination of both) that can be connected to the network 930. For example, memory 906 can be a database storing data consistent with this disclosure. Although illustrated as a single memory 906 in FIG. 9, two or more memories may be used according to particular needs, desires, or particular implementations of the computer 902 and the described functionality. While memory 906 is illustrated as an integral component of the computer 902, in alternative implementations, memory 906 can be external to the computer 902.

The application 907 is an algorithmic software engine providing functionality according to particular needs, desires, or particular implementations of the computer 902, particularly with respect to functionality described in this disclosure. For example, the application 907 can serve as one or more components, modules, applications, etc. Further, although illustrated as a single application 907, the application 907 may be implemented as multiple applications 907 on the computer 902. In addition, although illustrated as integral to the computer 902, in alternative implementations, the application 907 can be external to the computer 902.

There may be any number of computers 902 associated with, or external to, a computer system containing computer 902, each computer 902 communicating over network 930. Further, the term "client," "user," and other appropriate terminology may be used interchangeably as appropriate without departing from the scope of this disclosure. Moreover, this disclosure contemplates that many users may use one computer 902, or that one user may use multiple computers 902.

In some embodiments, the computer 902 is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (SaaS), mobile "backend" as a service (MBaaS), serverless computing, artificial intelligence (AI) as a service (AIaaS), and/or function as a service (FaaS).

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to "a seismic trace" includes reference to one or more of such traces.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowchart may be omitted, repeated, and/or performed in a different order than the order shown. Accordingly, the scope disclosed herein should not be considered limited to the specific arrangement of steps shown in the flowchart.

Although multiple dependent claims are not introduced, it would be apparent to one of ordinary skill that the subject matter of the dependent claims of one or more embodiments may be combined with other dependent claims.

Although only a few example embodiments have been described in detail previously, those skilled in the art will readily appreciate that many modifications are possible in the example embodiments without materially departing from this invention. Accordingly, all such modifications are intended to be included within the scope of this disclosure as defined in the following claims.

What is claimed:

1. A method for evaluating potential damage to a cement sheath in an underground gas storage facility during an earthquake, comprising:

obtaining a plurality of data points related to one or more static mechanical properties of a casing-cement-rock well system;

obtaining a plurality of data points related to one or more dynamic mechanical properties of the casing-cement-rock well system;

obtaining a ground surface earthquake (EQ) wave;

performing a deconvolution analysis on the ground surface EQ wave to produce a subsurface EQ wave;

generating a computational model of the casing-cement-rock well system and an underground storage cavern, wherein the computational model comprises an upper surface, one or more lateral surfaces, and a lower surface, and wherein a roller boundary is applied to the lower surface;

applying a first gas pressure value to the computational model;

using the computational model, simulating a first static equilibrium state based on the first gas pressure value;

applying a quiet boundary to the upper surface and the one or more lateral surfaces;

using the computational model, simulating a first dynamic seismic event based on the first gas pressure value and the subsurface EQ wave;

continuously evaluating a first effect of the first dynamic seismic event on a first integrity of the casing-cement-rock well system and the underground storage cavern, wherein continuously evaluating the first effect identifies a safe operating gas pressure window comprising a range of safe gas pressure values of the underground gas storage facility that mitigate earthquake-induced damage to the underground gas storage facility; and adjusting at least one parameter related to an operation of the underground gas storage facility based on the first effect of the first dynamic seismic event on the first integrity of the casing-cement-rock well system and the underground storage cavern, wherein the at least one parameter comprises an adjusted gas pressure of the underground gas storage facility, the adjusted gas pressure selected from the range of safe gas pressure values of the safe operating gas pressure window, wherein adjusting the at least one parameter mitigates the earthquake-induced damage to the underground gas storage facility.

2. The method of claim 1, further comprising:

applying a second gas pressure value to the computational model;

using the computational model, simulating a second static equilibrium state based on the second gas pressure value;

using the computational model, simulating a second dynamic seismic event based on the second gas pressure value and the subsurface EQ wave;

continuously evaluating a second effect of the second dynamic seismic event on a second integrity of the casing-cement-rock well system and the underground storage cavern; and adjusting at least one parameter related to the operation of the underground gas storage facility based on the second effect of the second dynamic seismic event on the second integrity of the casing-cement-rock well system and the underground storage cavern.

3. The method of claim 1, wherein the upper surface is a surface above the underground storage cavern, the one or more lateral surfaces are surfaces lateral to the underground storage cavern, and the lower surface is a surface beneath the underground storage cavern.

4. The method of claim 1, wherein generating the computational model further comprises:

assigning the one or more static mechanical properties to a corresponding component on the computational model;

assigning the one or more dynamic mechanical properties to a corresponding component on the computational model;

applying a first stress boundary condition to the upper surface; and applying a second stress boundary condition to the one or more lateral surfaces.

5. The method of claim 4, wherein the first stress boundary condition is an overburden value, and the second stress boundary condition is a horizontal stress value.

6. The method of claim 1, wherein the ground surface EQ wave is a historical ground surface EQ wave recorded in a location at or near a location of the underground gas storage facility.

7. The method of claim 1, wherein performing the deconvolution analysis comprises:

obtaining one or more properties of one or more geologic layers;

using the one or more properties of the one or more geologic layers, deconvoluting the ground surface EQ wave to a subsurface location, wherein the subsurface location is at a depth beneath the underground storage cavern; and determining the subsurface EQ wave at the subsurface location.

8. The method of claim 1, wherein simulating the first dynamic seismic event further comprises:

removing the roller boundary from the lower surface;

applying the subsurface EQ wave to the lower surface; and advancing the computational model through a duration of the subsurface EQ wave.

9. The method of claim 2, wherein simulating the second static equilibrium state further comprises:

removing the subsurface EQ wave from the lower surface;

removing the quiet boundary from the upper surface and the one or more lateral surfaces; and applying the roller boundary to the lower surface.

10. The method of claim 2, wherein simulating the second dynamic seismic event further comprises:

applying the quiet boundary to the upper surface and the one or more lateral surfaces;

removing the roller boundary from the lower surface;

applying the subsurface EQ wave to the lower surface; and advancing the computational model through a duration of the subsurface EQ wave.

11. The method of claim 1, wherein the at least one parameter comprises a specific cement composition.

12. The method of claim 1, wherein the at least one parameter comprises a casing material property.

13. The method of claim 1, wherein the at least one parameter comprises an architecture of the underground storage cavern.

* * * * *